(12) United States Patent
Lin et al.

(10) Patent No.: US 8,860,664 B2
(45) Date of Patent: Oct. 14, 2014

(54) MOUSE DEVICE

(71) Applicant: Giga-Byte Technology Co., Ltd., New Taipei (TW)

(72) Inventors: Yin Yu Lin, New Taipei (TW); Lin Pei Chen, New Taipei (TW); Shu I Chen, New Taipei (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 144 days.

(21) Appl. No.: 13/732,325

(22) Filed: Dec. 31, 2012

(65) Prior Publication Data

US 2014/0022748 A1    Jan. 23, 2014

(30) Foreign Application Priority Data

Jul. 17, 2012   (TW) .............................. 101125672 A (51) Int. Cl.
*G06F 3/033*   (2013.01)
*G09G 5/08*    (2006.01)
*G06F 3/0354*  (2013.01)

(52) U.S. Cl.
CPC ............ *G06F 3/033* (2013.01); *G06F 3/03543* (2013.01)
USPC ........................................... 345/166; 345/163

(58) Field of Classification Search
None
See application file for complete search history.

(56) References Cited

U.S. PATENT DOCUMENTS

| | | | |
|---|---|---|---|
| 2003/0103040 A1* | 6/2003 | Koike et al. | 345/163 |
| 2009/0046062 A1* | 2/2009 | Sayyadi et al. | 345/158 |
| 2011/0141017 A1* | 6/2011 | Ku | 345/163 |

* cited by examiner

*Primary Examiner* — Nicholas Lee
(74) *Attorney, Agent, or Firm* — Chun-Ming Shih (57) ABSTRACT

A mouse device used on a surface includes a main body, a circuit assembly and a back cover. The main body includes a bottom and at least one slot formed at the bottom. The circuit assembly is disposed within the main body and executing a default function of the mouse device. The back cover comprises a first side, a second side, at least one hook at the first side, and a plurality of pads at the second side. The back cover contacts with the surface via the plurality of the pads, is disposed detachably at the bottom of the main body and is buckled to the slot by the hook.

14 Claims, 11 Drawing Sheets

MOUSE DEVICE

BACKGROUND OF THE INVENTION

1. Field of the Invention

The present invention relates to a mouse device, especially to a mouse device comprising a replaceable back cover.

2. Description of Related Art

As technology moves on, the prevailing of computers has brought many conveniences to common life by audio/video streams, e-mails, computer-aided art designing and game entertainments. As the increasing requirement on computer facilities, new technology is kept being developed for enhancing the functionality of the computer itself together with the peripherals especially human-machine interface (HMI) input devices. Among others, the mouse device is most frequently used.

Conventionally, instructions are executed or the window is scrolled in an operating system of a computer by clicking buttons or scrolling a wheel on the mouse device. However, for the most part, whether the cursor in a window can move smoothly on the screen depends on the contact between the pad(s) on the bottom of the mouse and a working surface like a desk surface or a mouse pad. Needless to say, the material of the working surface will influence the movement of the mouse device.

Furthermore, after long term use of the mouse device, wear of pads due to friction is inevitable and consequently the mouse device cannot be operated smoothly. For example, the sensitivity and operability of the mouse device may degrade undesirably so that it should be discarded finally. As a result, there is a need for a mouse device in which the pad(s) on the bottom thereof can be replaced easily.

To solve the above problem, a mouse device has been proposed comprising a shell body, at least one replaceable cover, and a plurality of pads. The replaceable cover is disposed at the bottom of the shell body, and the plurality of the pads are respectively disposed at the both sides of the replaceable cover. The pads on the both sides can be used by flipping the replaceable cover over. When the pads on one side of the replaceable cover wear out, by flipping the replaceable cover over, the pads on the other side thereof can be utilized instead. The user doesn't have to discard the entire mouse device simply because of the worn-out pads, thus prolonging the lifetime of the mouse device. However, such conventional mouse device should be configured symmetrically on both sides and the material of the pads is preferably the same. Otherwise, it is apparent that some problems will occur when flipping the replaceable cover over.

As the above conventional mouse device requires the same material for the pads on both sides, it is not suitable for those who have to use the pads of different material under different situations. Therefore, in the marketplace, a mouse device is needful in which the pads underlying the bottom thereof can be easily and conveniently replaced with those of different material. It is believed that the inventive and cost-effective mouse device will provide more convenience and operational flexibility than the conventional one.

SUMMARY OF THE INVENTION

In view of this, the present invention solves the above problems by providing a mouse device in which the pads can be replaced easily either when worn out or for different material.

In one embodiment, a mouse device used on a surface comprises a main body, a circuit assembly and a back cover. The main body comprises an inner accommodating space to contain the circuit assembly executing default functions of the mouse device. A bottom of the main body comprises at least one slot. One side of the back cover comprises at least one hook located corresponding to the slot, and the other side of the back cover comprises a plurality of pads by which the back cover contacts with the surface. The back cover is detachably disposed at the bottom of the main body and buckled to the slot by the hook so that the back cover is firmly combined with the main body.

In another embodiment, a mouse device used on a surface comprises a main body, a circuit assembly, a first back cover and a second back cover. The main body comprises an inner accommodating space to contain the circuit assembly executing default functions of the mouse device. A bottom of the main body comprises at least one slot and a plurality of concaves. One side of the two back covers comprises a plurality of hooks located corresponding to the slot, and the other side of the two back covers comprises a plurality of pads by which the back cover contacts with the surface. The material of the pads of the first back cover is different from that of the pads of the second back cover. One of the two back covers is selected to be detachably disposed at the bottom of the main body and buckled to the slot by the hooks so that the back cover is firmly combined with the main body. In particular, the pads of the first back cover are projectively disposed at the side of the first back cover and are located within the plurality of the concaves when the first back cover is selected to be disposed at the bottom of the main body.

The present invention is advantageous basically because the back cover of the mouse device is designed to be detachably disposed at the main body of the mouse device. Thus, the pads can be replaced easily whenever desired, and the material of the pads is not confined to be identical with the original one. The entire mouse device therefore has a prolonged lifetime and brings about more convenience and flexibility for the user.

It should be emphasized that by taking advantage of the concave structure of the main body, the distance between the main body and the working surface of the mouse device can be kept constant in spite of varied thickness of the pads. In this way, the mouse device can accurately execute operation and avoid false operation effectively.

These and other objectives of the present invention will no doubt become obvious to those of ordinary skill in the art after reading the following detailed description of the preferred embodiments that is illustrated in the various figures and drawings.

DETAILED DESCRIPTION OF THE PREFERRED EMBODIMENTS

It is noted that in the following embodiments a gaming mouse is used as an exemplary interpretation of a mouse device 100 without any intention to limit the scope of the present invention. Those skilled in the art may modify the appearance and the function of the mouse device 100 according to user requirements.

Figure 1:
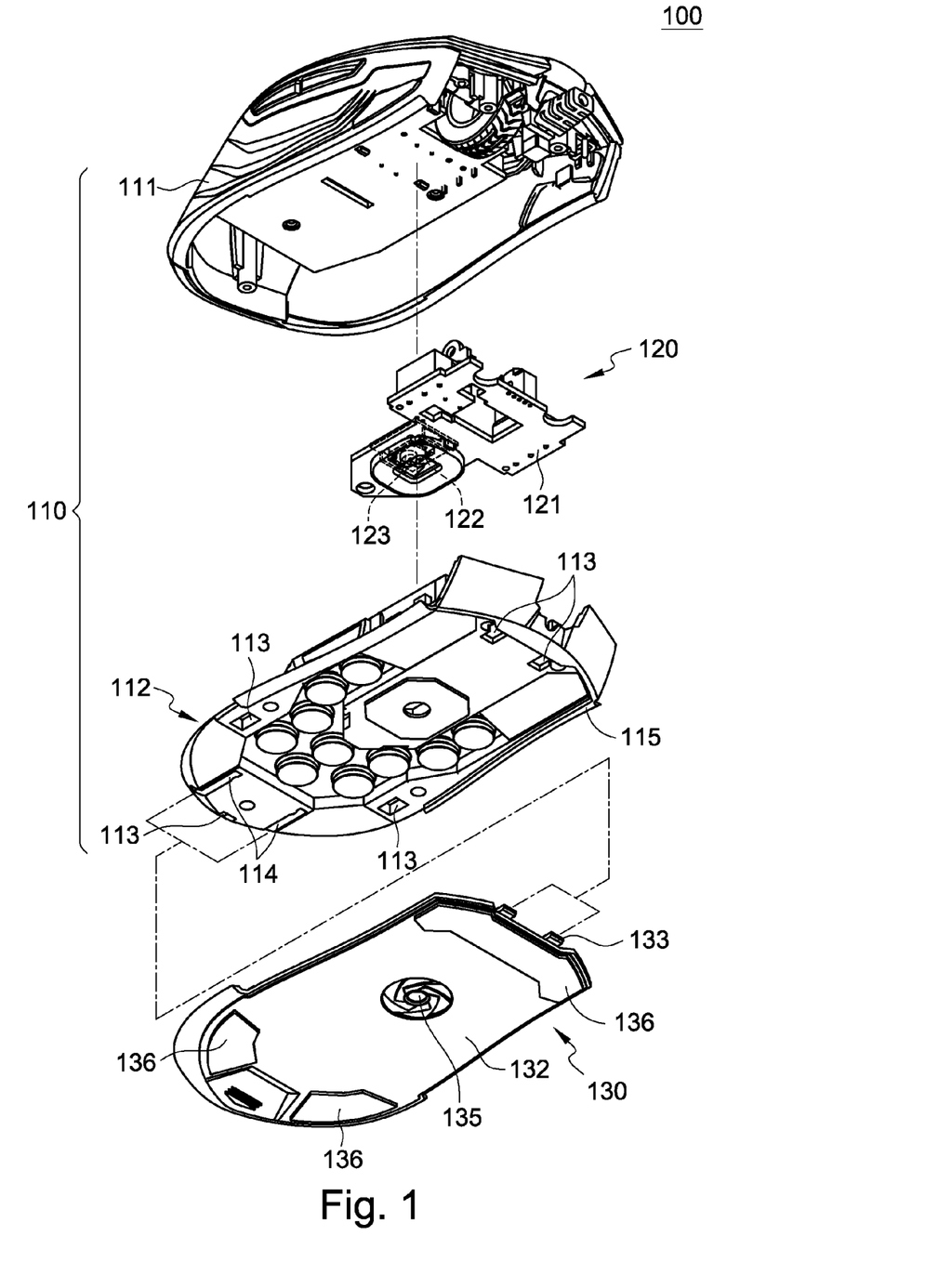
FIG. 1 is a partial breakdown diagram of a first embodiment of the present invention.
Figure 2:
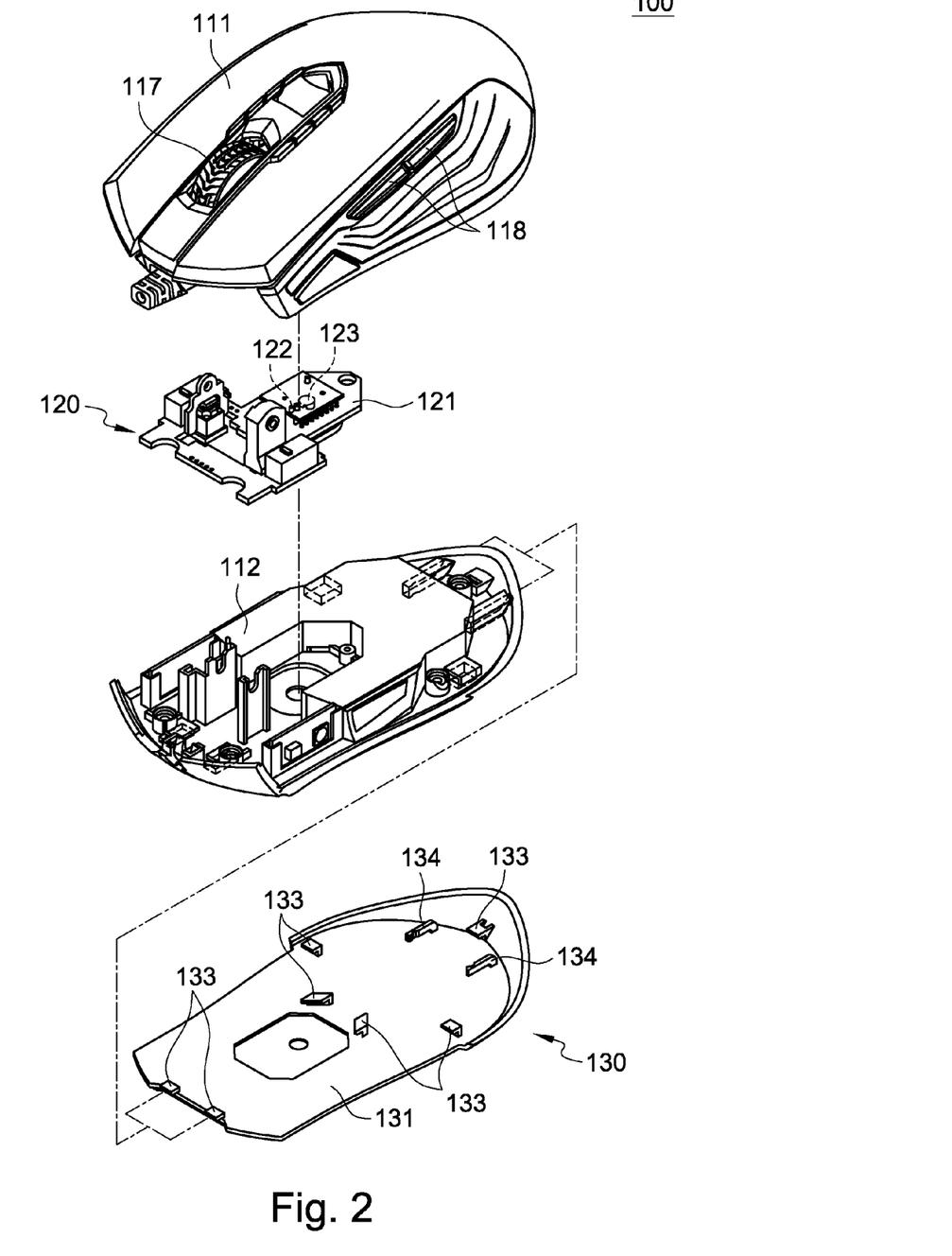
FIG. 2 is a partial breakdown diagram of the first embodiment of the present invention in another viewpoint.
Figure 3:
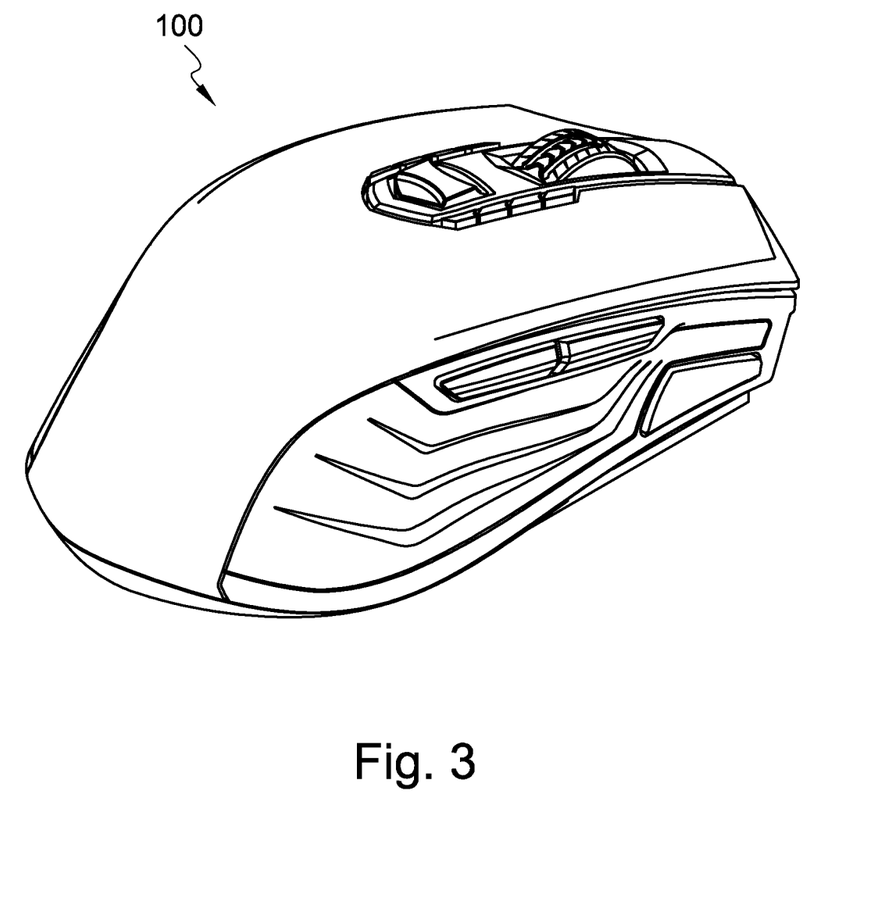
FIG. 3 is a three dimensional view of the first embodiment of the present invention.
Figure 4:
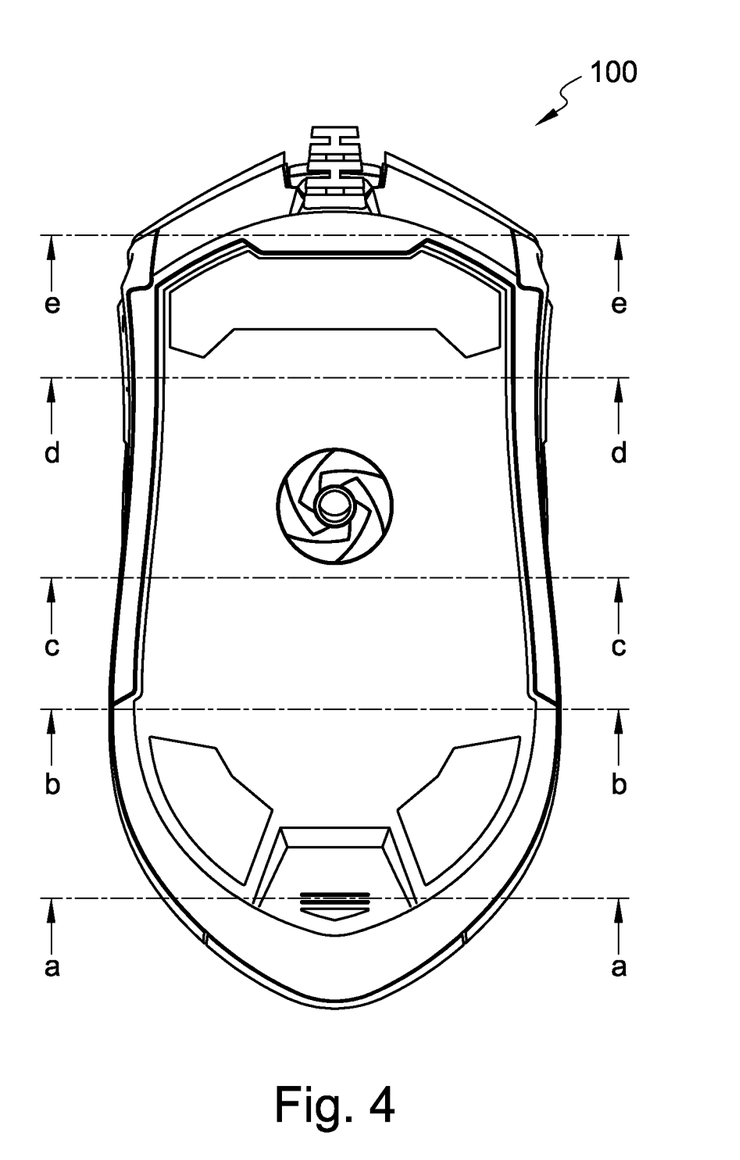
FIG. 4 is a sectional view of the first embodiment of the present invention.
Figure 5A:
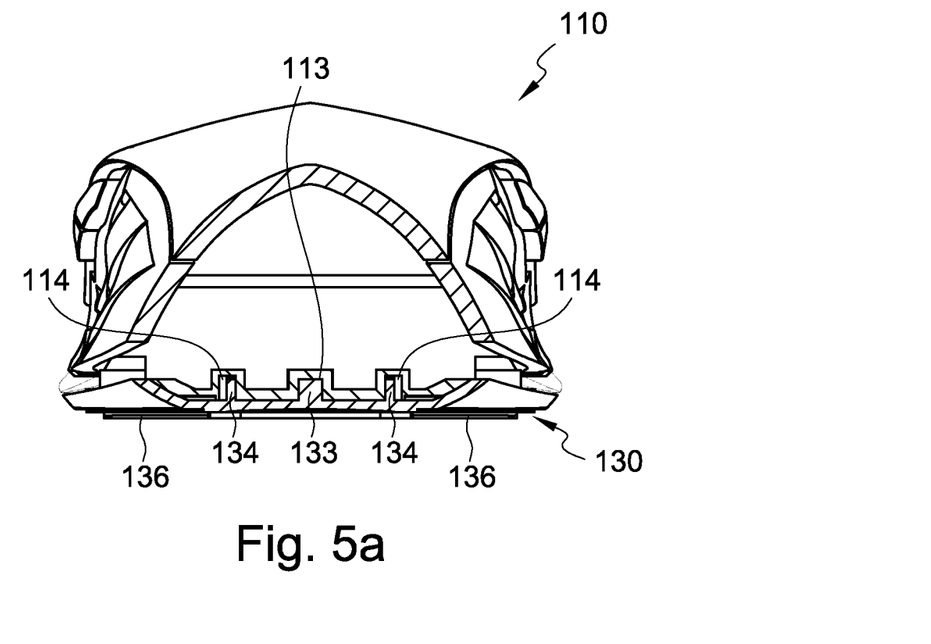
FIG. 5*a* to FIG. 5*e* are sectional side views of the main body and the back cover of the first embodiment of the present invention.
Figure 5B:
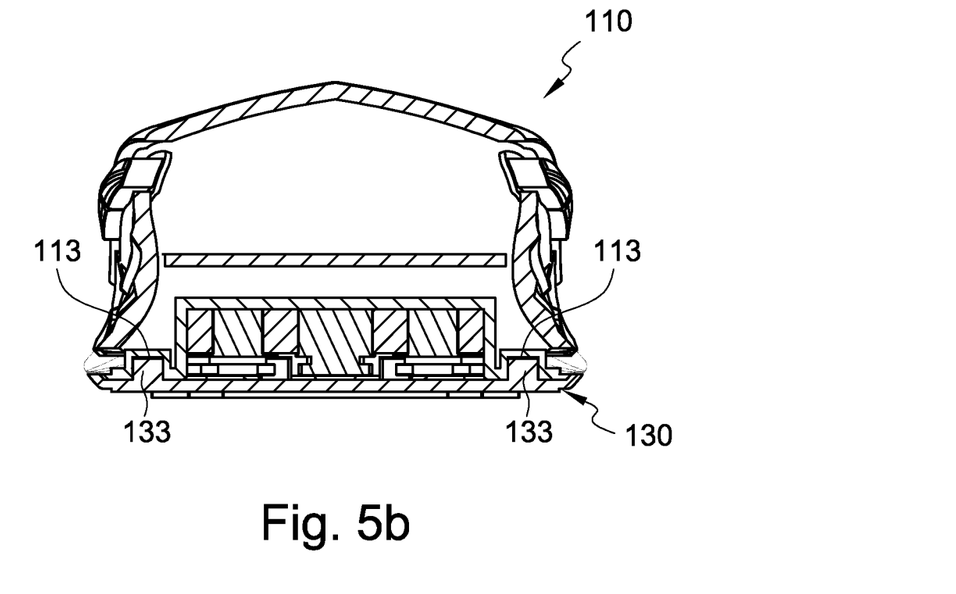
Figure 5C:
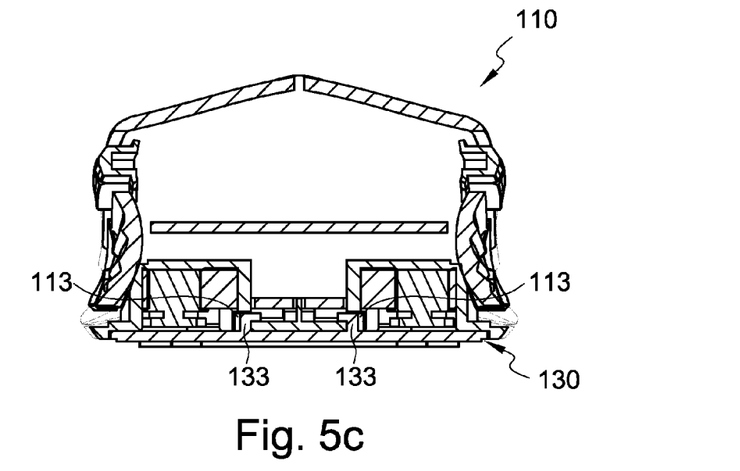
Figure 5D:
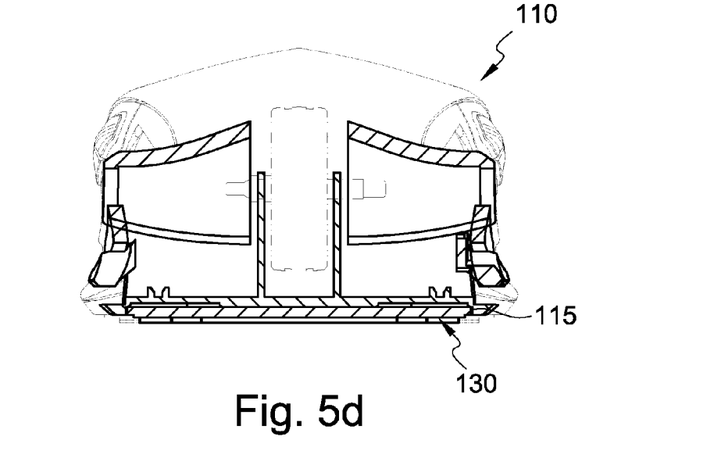
Figure 5E:
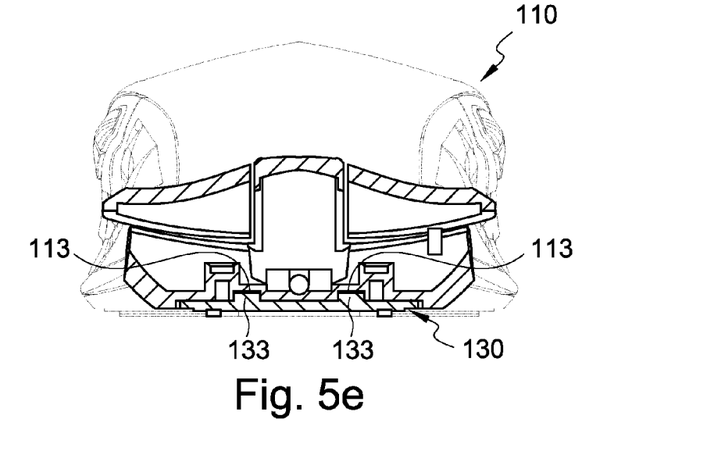

FIGS. 1 and 2 are partial breakdown diagrams of the mouse device 100 of the first embodiment. The mouse device 100 is operated on a surface 160 like a desk surface or mouse pad of some kind of material for correspondingly controlling a cursor action in an operating system of a computer device (not shown) and executing default functions.

In this embodiment, the mouse device 100 includes a main body 110, a circuit assembly 120 and a back cover 130. The main body 110 is composed of an upper shell body 111 and a lower shell body 112, thereby forming an inner accommodating space. A plurality of buttons 118 and a wheel 117 are provided on a top surface of the upper shell body 111, and a bottom of the lower shell body 112 has a plurality of slots 113, two guiding grooves 114 and a sliding track 115.

In more detail, the slots 113 are disposed at a front, rear, left and right of the bottom of the lower shell body 112 respectively. The two guiding grooves 114 are disposed symmetrically at the front of the bottom of the lower shell body 112. The sliding track 115 is disposed at the rear of the bottom of the lower shell body 112 and has a U-shape.

The circuit assembly 120 is similar to the electrical component of a conventional mouse device for executing default functions such as moving the cursor, clicking to invoke programs, scrolling pages and bringing up menus. So the details related to the functions are not described herein for avoiding unnecessary confusion. However, the electrical components involved in the present invention will be explicitly interpreted in the following paragraphs.

The circuit assembly 120 includes a circuit board 121, a light emitting device 122 and an optical sensor 123. The light emitting device 122 and the optical sensor 123 are electrically disposed on the circuit board 121 that is screwed to the lower shell body 112 of the main body 110 and located in the accommodating space formed by the upper shell body 111 and the lower shell body 112. The bottom of the lower shell body 112 of the main body 110 has an opening exposing the optical sensor 123 and the light emitting device 122 from the bottom of the lower shell body 112. The light emitting device 122 emits a light toward a surface 160, and the optical sensor 123 receives and detects the light reflected from the surface 160. The buttons 118 and the wheel 117 are electrically connected to the circuit assembly 120 as input devices. The light emitting device 122 may be but not limited to a light-emitting diode (LED) or a bulb.

The back cover 130 is detachably disposed on the bottom of the lower shell body 112 of the main body 110 and has a first side 131 and a second side 132 opposed to each other. The first side 131 is provided with a plurality of hooks 133 and two positioning components 134. The hooks 133 are disposed at a front, rear, left and right of the back cover 130 and located corresponding to the slots 113 on the bottom of the lower shell body 112 respectively, while the positioning components 134 respectively correspond to the guiding grooves 114 on the bottom of the lower shell body 112.

Besides, the second side 132 of the back cover 130 has a plurality of pads 136 that can be made of Teflon, ceramics or glass. The pads 136 are evenly arranged on the second side 132 of the back cover 130 by for example gluing, wedging or screwing. It is to be noted that the material of the pads 136 is not limited to those mentioned above, and the pads 136 may be disposed in desired positions on the back cover 130 by using other method than what are disclosed here.

FIGS. 3 to 5e are schematic illustrations of the mouse device of the first embodiment. When combining the back cover 130 with the main body 110 in assembling the mouse device 100, the first side 131 of the back cover 130 faces the bottom of the main body 110, and an outer edge of the back cover 130 is slid into the sliding track 115 provided on the bottom of the main body 110 to secure the back cover 130 to the main body 110. Also, the positioning components 134 on the first side 131 of the back cover 130 are slid into the guiding grooves 114 on the bottom of the main body 110 in order to serve as a guide for the back cover 130 to facilitate the positioning. Consequently, the hooks 133 are respectively buckled to the slots 113 on the bottom of the main body 110, so that the back cover 130 is firmly combined with the main body 110.

Figure 6:
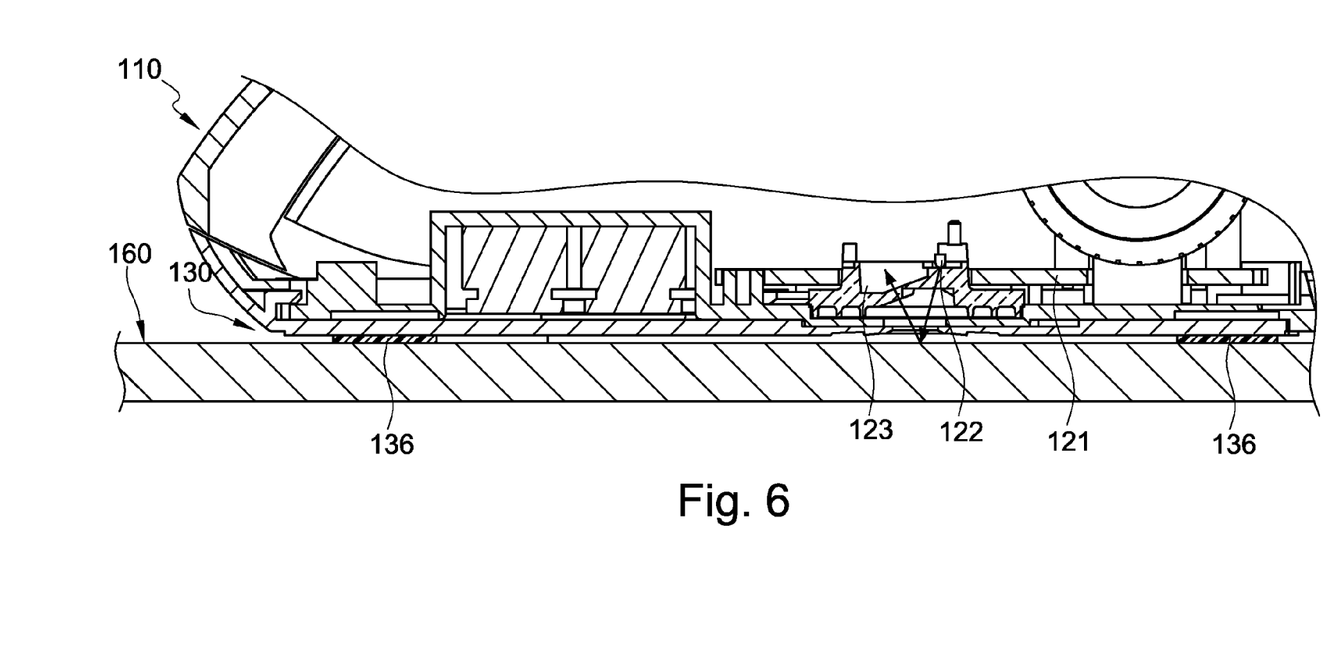
FIG. 6 is a sectional side view of the mouse device of the first embodiment of the present invention wherein the mouse device is under operation.

FIG. 6 illustrates a sectional side view of a light path of the mouse device 100 in use according to the first embodiment. The back cover 130 includes an opening 135 penetrating the first side 131 and the second side 132 and corresponding to an aperture at the bottom of the lower shell body 112. In this way, light emitted from the light emitting device 122 of the circuit assembly 120 passes through the opening 135 of the back cover 130, projects onto the surface 160, and reflects from the surface 160. Then, the reflected light passing through the opening 135 again in the reverse direction is received by the optical sensor 123 of the circuit board 121. The mouse device 100 can be moved on the surface 160 with the pads 136 on the back cover 130 contacting the working surface directly. The optical sensor 123 constantly receives the dynamic signals from the light and the cursor on the screen moves correspondingly. The buttons 118 and the wheel 117 on the top of the main body 110 are configured to select or interact with an element of a graphical user interface, as is well-known to one of ordinary skill.

To sum up, in the embodiment, the mouse device 100 takes advantage of the hooks and the slots to achieve an easy replacement of the back cover 130.

FIGS. 7 to 9b are partial breakdown diagrams and sectional side views of a second embodiment of the present invention. The structure of a mouse device 100 of the second embodiment is basically similar to that of the first embodiment with only some differences that will be addressed later.

Figure 7:
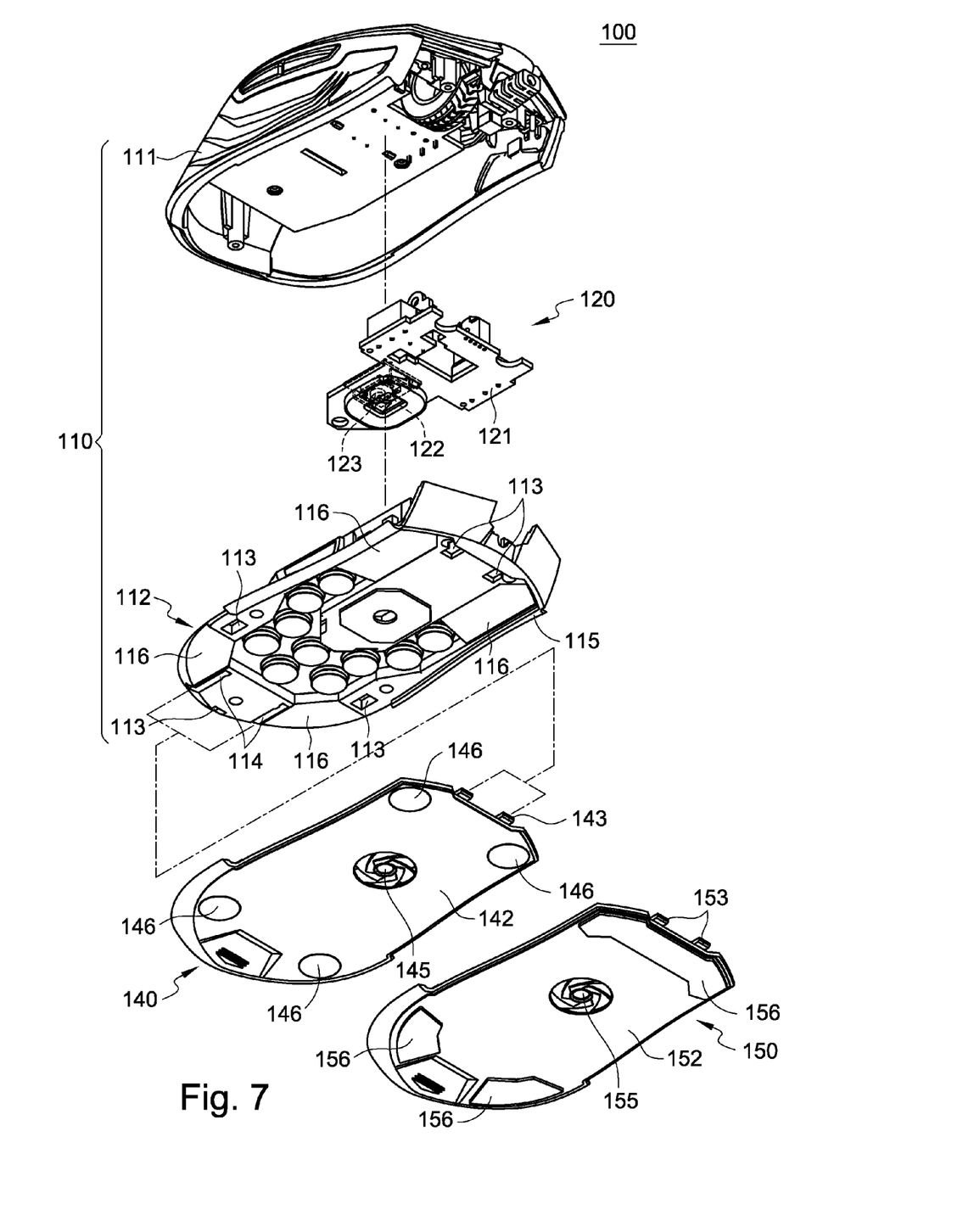
FIG. 7 is a partial breakdown diagram of a second embodiment of the present invention.
Figure 8:
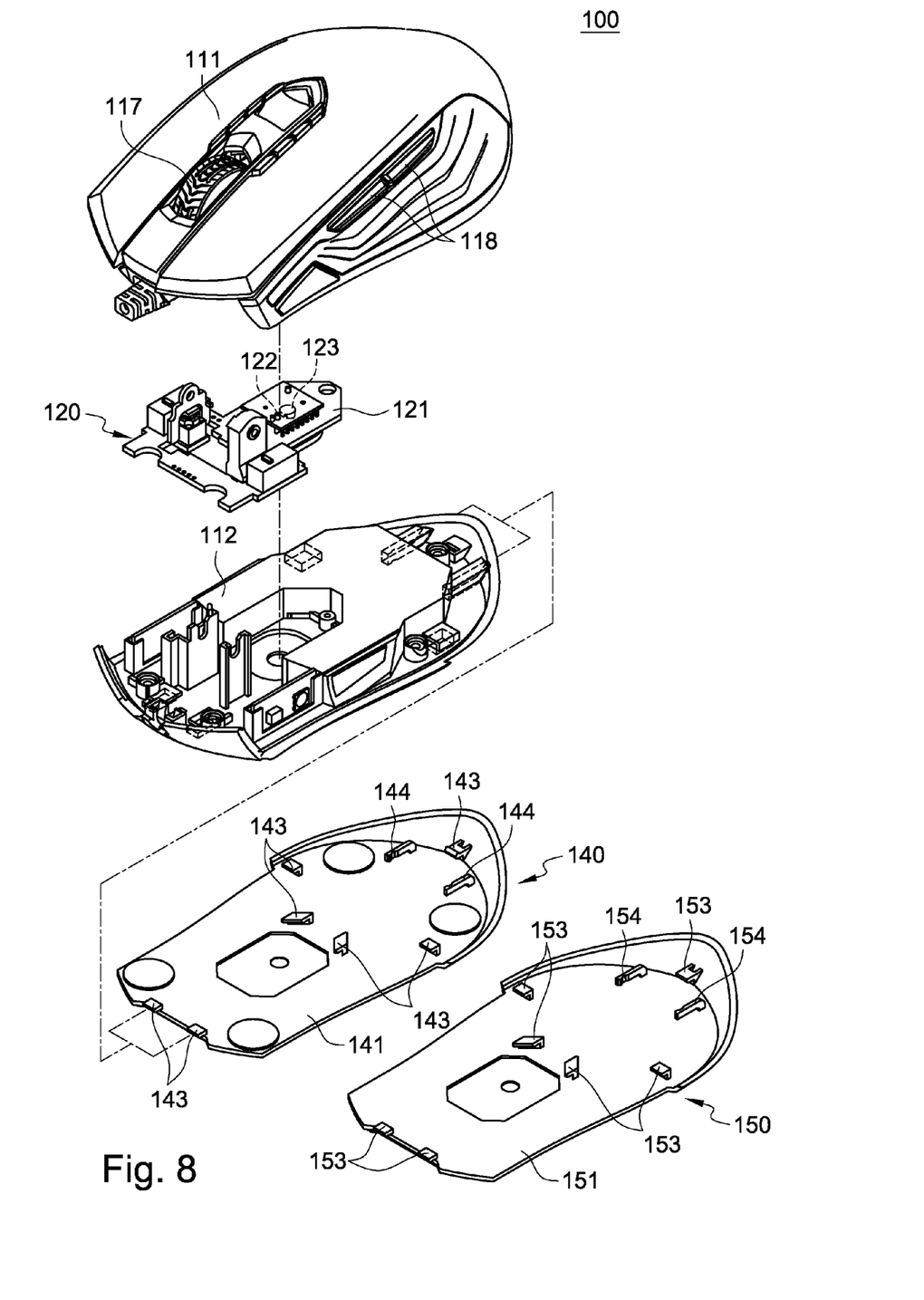
FIG. 8 is a partial breakdown diagram of the second embodiment of the present invention.

The mouse device 100 includes a main body 110, a circuit assembly 120, a first back cover 140 and a second back cover 150. The main body 110 has an inner accommodating space to contain the circuit assembly 120 executing default functions of the mouse device 100. A bottom of the main body 110 has a plurality of slots 113 and a plurality of concaves 116. One of the first and the second back covers 140 and 150 is selected arbitrarily to be detachably disposed at the bottom of a lower shell body 112 of the main body 110. The two back covers 140 and 150 that are similar in structure in this embodiment respectively includes a first side 141/151 and a second side 142/152 opposed to each other. And the first side 141/151 is provided with a plurality of hooks 143/153 and two positioning components 144/154.

In more detail, the plurality of hooks 143/153 are disposed at a front, rear, left and right of the first back cover 140 or the second back cover 150 and located corresponding to the slots 113 on the bottom of the lower shell body 112 respectively, while the two positioning components 144 or 154 are disposed at the first sides 141 or 151 of the first back cover 140 or the second back cover 150 and located corresponding to a plurality of guiding grooves 114 on the bottom of the lower shell body 112 respectively.

Besides, the second side 142 or 152 of the first back cover 140 or the second back cover 150 has a plurality of pads 146 or 156 wherein the pads 146 of the first back cover 140 can be made of ceramics, and the pads 156 of the second back cover 150 can be made of Teflon. The pads 146 or 156 are evenly arranged on the second side 142 or 152 by for example gluing, wedging or screwing. It is to be noted that the material of the pads 146 and 156 is not limited to those mentioned above, and the pads 146 and 156 may be disposed in desired positions on the two back covers 140 and 150 by using other method than what are disclosed here.

The difference between the two back covers 140 and 150 is that the pads 146 of the first back cover 140 are projectively disposed at the first side 141 of the first back cover 140, while the pads 156 of the second back cover 150 are not projectively disposed at the first side 151 of the second back cover 150.

When combining one of the two back covers 140 and 150 with the main body 110 in assembling the mouse device 100, the first side 141 or 151 of the first back cover 140 or the second back cover 150 faces the bottom of the main body 110, and an outer edge of the back cover 140 or 150 is slid into the sliding track 115 provided on the bottom of the main body 110 to secure the back cover 140 or 150 to the main body 110. Also, the positioning components 144 or 154 on the first side 141 or 151 are slid into the guiding grooves 114 on the bottom of the main body 110 in order to serve as a guide for the back cover 140 or 150 to facilitate the positioning. Consequently, the hooks 143 or 153 are respectively buckled to the slot 113 on the bottom of the main body 110, so that the back cover 140 or 150 is firmly combined with the main body 110. (Please also refer to FIG. 3 to FIG. 5e of the first embodiment.)

Figure 9A:
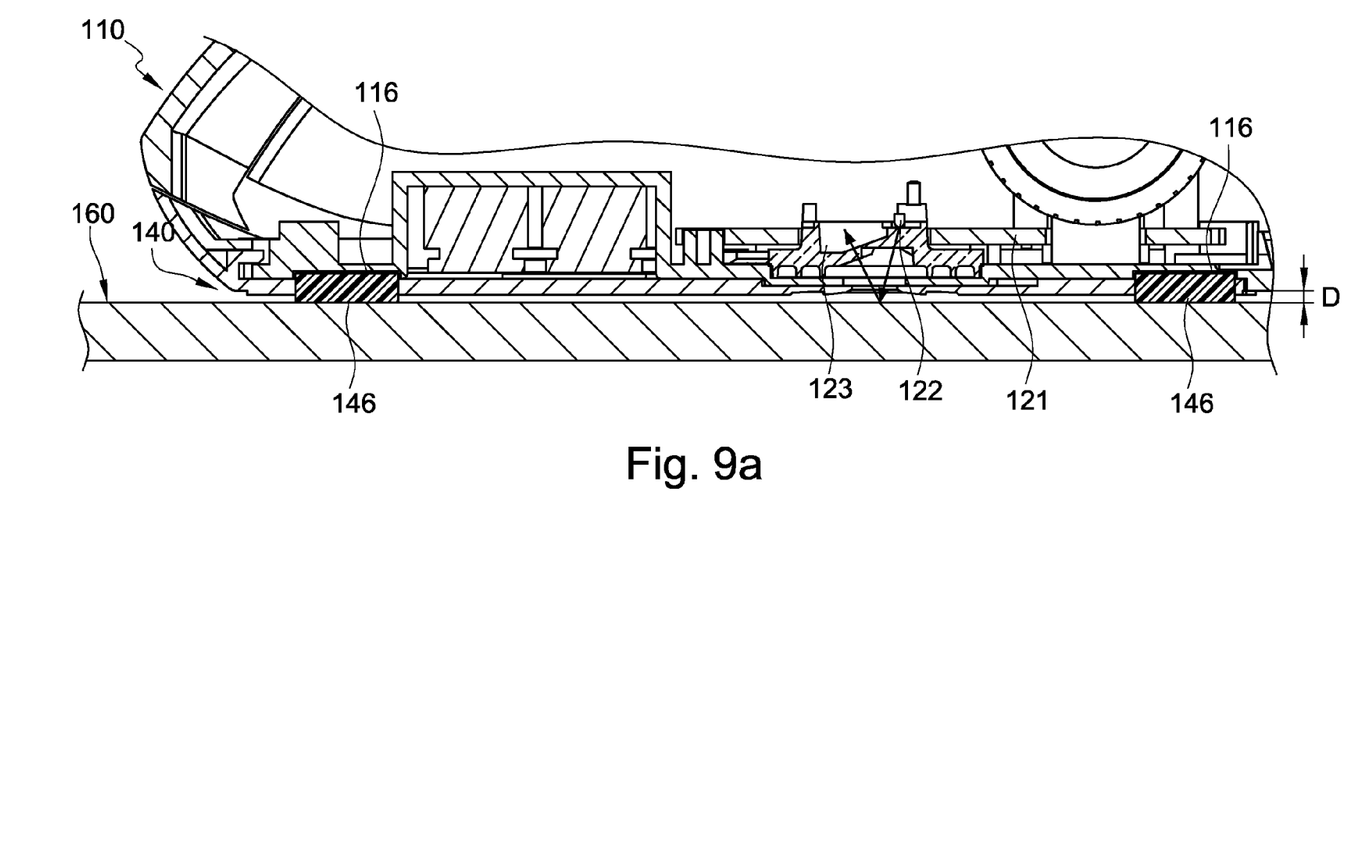
FIG. 9a is a sectional side view of the main body and the first back cover of the second embodiment of the present invention.
Figure 9B:
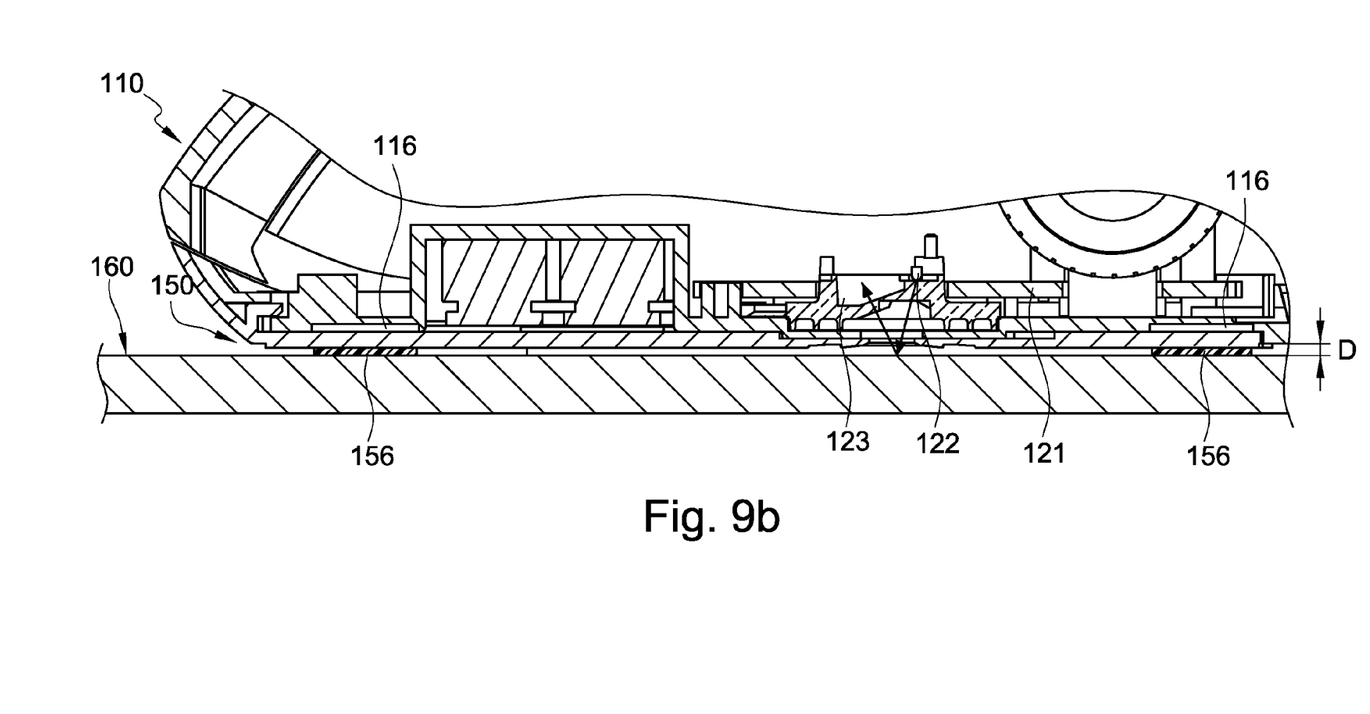
FIG. 9b is a sectional side view of the main body and the second back cover of the second embodiment of the present invention.

FIG. 9a is a sectional side view of the main body and the first back cover of the second embodiment, and FIG. 9b is a sectional side view of the main body and the second back cover of the second embodiment. Since the pads 146 of the first back cover 140 are made of ceramics and are somewhat thick due to the limitation on molding technique, the pads 146 are projectively formed at the first side 141 of the first back cover 140. As a result, when the first back cover 140 is selected to be disposed at the bottom of the main body 110, the plurality of pads 146 projectively disposed at the first side 141 are located within the plurality of concaves 116 respectively. Thus, the first side 141 can be attached to the bottom of the main body 110 without any space therebetween and a gap of D is formed between the main body 110 where the first back cover 140 is provided and a surface 160 during operation. Alternatively, when the second back cover 150 is selected to be disposed at the bottom of the main body 110, the first side 151 can also be attached to the bottom of the main body 110 without any space therebetween. Since the pads 156 will not project from the first side 151 of the second back cover 150, they won't impede the assembly of the second back cover 150. So the same gap of D exists between the main body 110 where the second cover 150 is disposed and the surface 160 during operation.

Besides, each of the two back covers 140 and 150 includes an opening 145 or 155 penetrating the first side 141 or 151 and the second side 142 or 152 and corresponding to an aperture at the bottom of the lower shell body 112. In this way, light emitted from the light emitting device 122 on a circuit board 121 of the circuit assembly 120 may project onto and reflect from the surface 160 through the opening 145 or 155 of the back cover 140 or 150. Then, the reflected light passes through the opening 145 or 155 in the reverse direction and is received by an optical sensor 123 on the circuit board 121.

As a result, although the thickness of the pads 146 and 156 are different, the distance D between the main body 110 disposed with either of the back covers 140 and 150 and a surface 160 can be kept constant during operation due to the concaves located on the bottom of the main body 110.

As the pads 146 of the first back cover 140 made of ceramic material and the pads 156 of the second back cover 150 made of Teflon may be different in thickness, the concaves 116 at the bottom of the main body 110 are designed and adjusted such that the gap of D is maintained between the main body 110 and the surface 160 no matter back cover 140 or 150 is selected to be attached to the main body 110. Therefore, the optical sensor 123 and the mouse device 100 can work smoothly in spite of the different back covers.

To sum up, in the embodiment, the material of the pads of the back cover may be varied if required. In addition, the structure of the concaves is employed for the mouse device 100 to include the back covers with the pads of different material as desired without changing the gap distance between the main body and the working surface.

In the aforementioned embodiments, it is clearly described that the present invention solves the existing problems by providing the mouse device in which the pads can be replaced easily either when worn out or for different material.

The present invention is advantageous because the back cover of the mouse device is designed to be detachably disposed at the main body of the mouse device. Thus, the pads can be replaced easily whenever desired, and the material of the pads is not confined to be identical with the original one. The entire mouse device therefore has a prolonged lifetime and brings about more convenience and flexibility for the user.

The aforementioned descriptions represent merely the preferred embodiment of the present invention, without any intention to limit the scope of the present invention thereto. Various equivalent changes, alterations, or modifications based on the claims of the present invention are all consequently viewed as being embraced by the scope of the present invention.

What is claimed is:

1. A mouse device used on a surface, comprising:
   a main body comprising a bottom and at least one slot formed at the bottom;
   a circuit assembly disposed within the main body and executing a default function of the mouse device; and
   a back cover comprising a first side, a second side, at least one hook at the first side ,and a plurality of pads at the second side, the back cover contacting with the surface via the plurality of pads, being disposed detachably at the bottom of the main body and buckled to the slot by the hook.

2. The mouse device of claim 1, wherein the circuit assembly comprises a circuit board, a light emitting device and an optical sensor, in which the light emitting device and the optical sensor are electrically disposed on the circuit board, the back cover forms an opening corresponding to the light emitting device and the optical sensor, the light emitting device emits a light through the opening to the surface, and the optical sensor receives the light reflected from the surface through the opening.

3. The mouse device of claim 1, wherein the main body comprises an upper shell body and a lower shell body, both of which are assembled to form an accommodating space to contain the circuit assembly, and the slot is located on the bottom of the lower shell body.

4. The mouse device of claim 1, wherein the bottom of the main body further comprises a guiding groove at a front end of the main body, and the back cover comprises a positioning component corresponding to the guiding groove for sliding into the guiding groove when the back cover is disposed at the bottom of the main body.

5. The mouse device of claim 1, wherein the bottom of the main body comprises the plurality of slots at a front, rear, left and right of the main body respectively, the back cover comprises a plurality of hooks corresponding to and buckled to the plurality of slots respectively when disposed at the bottom of the main body.

6. The mouse device of claim 5, wherein the bottom of the main body further comprises a sliding track for an outer edge of the back cover to be inserted thereinto so that the hooks are buckled to the slots respectively.

7. The mouse device of claim 1, wherein the plurality of pads are made of Teflon or ceramics.

8. A mouse device used on a surface, comprising:
a main body comprising a bottom and at least one slot and a plurality of concaves formed at the bottom;
a circuit assembly disposed within the main body and executing a default function of the mouse device; and
a first back cover and a second back cover, each of which has at least one hook at a first side thereof and a plurality of pads at a second side thereof and contacts the surface via the plurality of pads, material of the plurality of pads of the first back cover being different from that of the second back cover, wherein one of the first and the second back covers is selected arbitrarily to be detachably disposed at the bottom of the main body, and the back cover that is selected to be disposed and the slot of the main body are buckled by the hook, wherein the plurality of pads of the first back cover are projectively disposed at the first side of the first back cover, and when the first back cover is selected to be disposed at the bottom of the main body, the plurality of pads projectively disposed at the first side of the first back cover are located within the plurality of concaves.

9. The mouse device of claim 8, wherein the circuit assembly comprises a circuit board, a light emitting device and an optical sensor, in which the light emitting device and the optical sensor are electrically disposed on the circuit board, each of the two back covers comprises an opening corresponding to the light emitting device and the optical sensor, the light emitting device emits a light through the opening to the surface, and the optical sensor receives the light reflected from the surface through the opening.

10. The mouse device of claim 8, wherein the main body comprises an upper shell body and a lower shell body, both of which are assembled to form an accommodating space to contain the circuit assembly and the slot and the plurality of concaves is located on the bottom of the lower shell body.

11. The mouse device of claim 8, wherein the bottom of the main body further comprises a guiding groove at a front end of the main body, and each of the two back covers comprises a positioning component corresponding to the guiding groove for sliding into the guiding groove when the back cover that is selected is disposed at the bottom of the main body.

12. The mouse device of claim 8, wherein the bottom of the main body comprises a plurality of the slots at a front, rear, left and right of the main body respectively, each of the two back covers comprises a plurality of hooks corresponding and buckled to the plurality of the slots respectively when disposed at the bottom of the main body.

13. The mouse device of claim 12, wherein the bottom of the main body further comprises a sliding track for an outer edge of the back cover that is selected to insert thereinto so that the hooks are buckled to the slots respectively.

14. The mouse device of claim 8, wherein the plurality of the pads of the first back cover are made of ceramics, and the plurality of the pads of the second back cover are made of Teflon.

* * * * *